No. 876,116. PATENTED JAN. 7, 1908.
F. VSETECKA.
WIRE WORKING TOOL.
APPLICATION FILED AUG. 19, 1907.
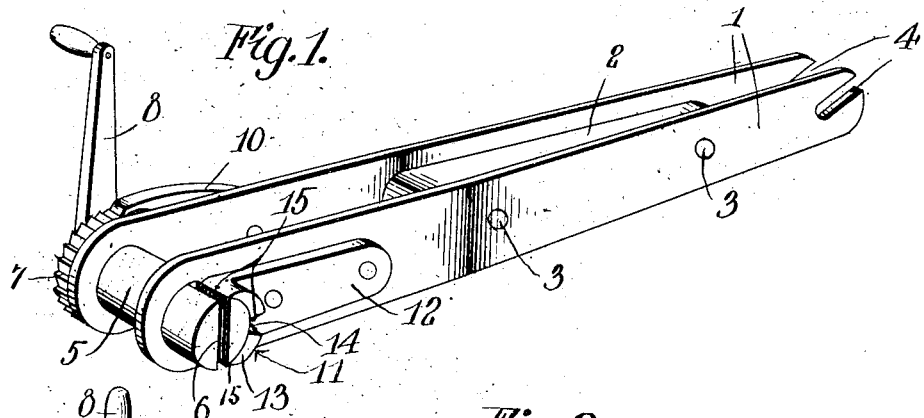
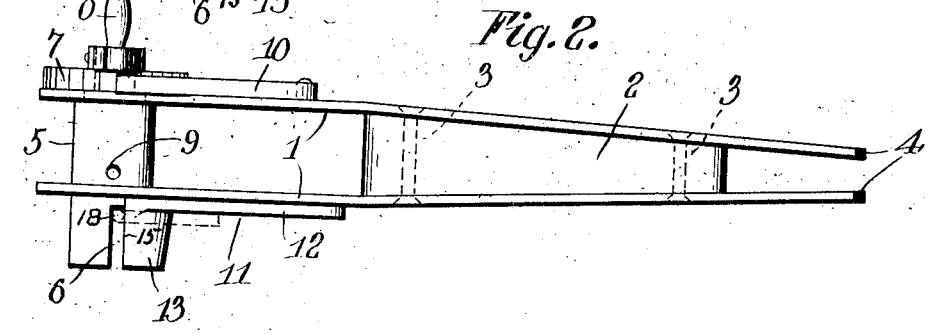
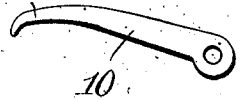
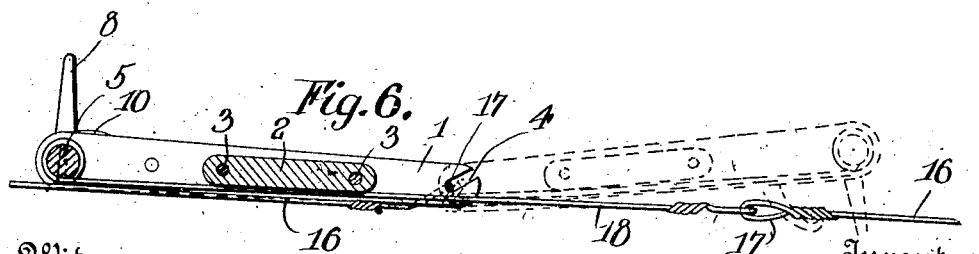
Witnesses
C. E. Smith
C. H. Grusbauer
Inventor
Frank Vsetecka.
by H. A. Wilson & Co.
Attorneys

UNITED STATES PATENT OFFICE.

FRANK VSETECKA, OF PROTIVIN, IOWA.

WIRE-WORKING TOOL.

No. 876,116.

Specification of Letters Patent.

Patented Jan. 7, 1908.

Application filed August 19, 1907. Serial No. 389,208.

*To all whom it may concern:*

Be it known that I, FRANK VSETECKA, a citizen of the United States, residing at Protivin, in the county of Howard and State of Iowa, have invented certain new and useful Improvements in Wire-Working Tools; and I do declare the following to be a full, clear, and exact description of the invention, such as will enable others skilled in the art to which it appertains to make and use the same.

This invention relates to wire working tools, and more particularly to a combination wire splicer, stretcher and clipper, and has for its object to provide a device by means of which strands of wire, as of a fence, may be readily stretched and reunited as by means of a supplemental wire, or otherwise. It is also provided with means for clipping wire for any purpose.

With these and other objects in view, the invention comprises the improved construction and novel arrangement of parts of a wire working tool as will be hereinafter more fully set forth.

Referring to the accompanying drawings, which are for illustrative purposes only, and, therefore, are not drawn to any particular scale, Figure 1 is a perspective view of an embodiment of the invention; Fig. 2 is a top plan view of the same, showing the end of a wire in position to be clipped or cut in two; Figs. 3, 4 and 5, are views of the pin, ratchet and pawl, respectively; and Fig. 6 is a longitudinal sectional view showing how the device is to be used in splicing a wire.

Referring to the drawings, 1—1 indicate two side pieces, which are rigidly secured upon opposite sides of a block, 2, by means of rivets, 3. The side pieces are preferably formed from sheet metal and the block is preferably in the form of a casting. The block 2 is preferably made slightly tapering so that the rear ends of the side pieces 1 are closer together than the forward ends, and the forward ends are slightly bent, so as to stand substantially parallel with each other. Slots or notches, 4, are formed in the rear ends of the side pieces, and a pin or roller, 5, is journaled in the forward end at a suitable distance in front of the block, 2. One end of the roller is slotted diametrically, as shown at 6, and has its other end provided with a ratchet wheel, 7, and a handle, 8. The slotted portion projects beyond one of the side pieces, and the end provided with the ratchet wheel and handle projects from the other side piece, and the intermediate portion is provided with a perforation, 9, through which the end of the wire is to be inserted when it is desired to use the drum for winding purposes. A pawl, 10, is pivotally mounted on one of the side pieces in position for its free end to engage with the teeth of the ratchet 7, and prevent retrograde movement of the drum. The handle end of the pin or drum is shouldered as at 5', which engages with the side piece 1 and prevents its going through in that direction, and it is prevented from coming out of the side pieces in the opposite direction by the ratchet wheel and handle when they are secured in position on the projecting end of the pin.

Rigidly secured to the side piece, adjacent to the slotted end of the pin, or roller, 5, is a clipper, 11, which is preferably in the form of a plate, 12, with a laterally extending crescent-shaped head, 13, the head being provided with a slot, 14, which is adapted to register with the slot, 6, and thereby form four cutting edges, two upon the sides of the slot, 14, and two at the edges of the head, the last-mentioned edges being sharp, or blade-like, as shown at 15.

In using the device as above described for splicing wire, as 16, eyes, 17, are formed in the ends thereof, as shown in Fig. 6, and the slotted end of the device is inserted in one of said eyes. A supplemental wire, 18, is joined at one end to the other eye, and has its free end passed under the device and up through the perforation, 9, in the pin, 5. The handle, 8, is then turned to wind the wire upon the pin until the wire has been stretched to the desired point or given the proper tension. The forward end of the tool or the end provided with the pin is then swung upwardly and rearwardly with the eye, 17, in the slot, 4, as a pivot, which will cause the supplemental wire to be bent around the portion of the loop within said notches. By the time the tool reaches a point as shown in dotted lines in Fig. 6, which will permit the eye 17 to slip out of the notches, 4, the supplemental wire will have been bent or doubled upon itself to such an extent as will prevent the wires slipping upon each other. The ratchet is then released from the pawl and the handle given a turn or two backward, so as to give enough slack to permit the tool being taken out of the eye 17 and tool is then swung around the supplemental wire, which will cause said wire to be twisted upon itself and thereby form a permanent connection between the eye, 17, and the supplemental wire. After this has been done, the supplemental wire, 18, can be passed into the slot, 6, as shown in Fig. 2, and a slight movement of the pin to the rear will cause the wire to be forced against the knife edge, 15, and be cut off. If the ends of the wire to be spliced are long enough, it is only necessary to form an eye in one end, which is inserted into the slots 4, as above described, and the free end of the other wire is passed under the portion of the eye in the slot and between the remaining portion and the block, 2, as in the first instance, and have its end inserted through the perforation, 9. The wire is then wound by the rotation of the pin, as above described, until the wire is drawn taut, when the tool is swung over and backward, as above described, and the doubled portion of the second wire is bent upon itself adjacent to the eye as soon as the eye slips out of the slots in the tool. The surplus portion of the wire is then cut off in the same manner as for the end of the supplemental wire. If at any time it is more convenient or desirable to use the slot, 14, in the head, 13, for cutting the wire, the slot 6 in the pin is brought into register therewith, and the wire inserted and cut off by rotating the pin in either direction, as will be well understood. The block 2 is of a less thickness than the width of the plates 1, so as to leave a suitable space between the surface of either side of the block and the edges of the side pieces adjacent thereto for the passage or insertion of the end of the wire in passing over or under the eye in the slot, as the case may be, to the pin, 5.

As above described, it will be seen that a tool constructed in this manner can be made very strong, compact and efficient, and that it can be readily applied for any use for which it is intended, and can be quickly disengaged after it has been used. By means of such a tool, wires can be quickly and efficiently stretched and spliced, and the surplus portion cut off by the use of a single tool, and, that one need not have a greater length than six and one half inches.

Having thus fully described my invention, what I claim as new, and desire to secure by Letters-Patent, is:

1. In combination with a wire stretching frame and a winding drum, of cutting edges on said drum, and a head on said frame adapted to co-act with said edges.

2. In combination with a wire stretching frame and a winding drum, of cutting edges on said drum, and a slotted head having cutting edges to co-act with the edges on the drum to sever a wire or the like.

In testimony whereof I have hereunto set my hand in presence of two subscribing witnesses.

FRANK VSETECKA.

Witnesses:
 ROBT. A. KLIMESH,
 J. A. DOSTAL.